United States Patent Office 3,227,683
Patented Jan. 4, 1966

3,227,683
PRODUCTION OF POLYURETHANES
Werner Schulte-Huermann, Krefeld, and Hermann Schnell, Krefeld-Uerdingen, Germany, assignors, by mesne assignments, to Mobay Chemical Company, Pittsburgh, Pa., a corporation of Delaware
No Drawing. Original application Jan. 20, 1958, Ser. No. 709,759, now Patent No. 3,076,784, dated Feb. 5, 1963. Divided and this application Oct. 11, 1961, Ser. No. 150,611
13 Claims. (Cl. 260—47)

This is a divisional application of our copending application Serial No. 709,759, filed January 20, 1958 now Patent No. 3,076,784.

This invention relates generally to polyethers and, more particularly, to a novel and improved method of making aromatic-aliphatic polyethers containing halogen atoms.

It has been proposed heretofore to react aliphatic dihalogen compounds or halogen epoxy compounds with aromatic dihydroxy compounds in the presence of acid-binding agents to prepare aromatic-aliphatic polyethers containing halogen atoms. Chlorine containing aromatic-aliphatic polyethers have also been prepared from tetrachlorohydroquinone and epichlorohydrin in the presence of alkali. Undesirable side products are formed by such a process, however, and are difficult to separate from the polyether containing halogens.

It is, therefore, an object of this invention to provide a novel method for preparing polyethers which contain halogen atoms. Another object of the invention is to provide a method for making polyethers containing halogen atoms without the simultaneous formation of undesirable side products.

Generally speaking, the foregoing objects and others are accomplished in accordance with this invention by providing a method for preparing polyethers containing halogen atoms by a process wherein a polyhaloaromatic compound, especially a polychlorobenzene, and an aliphatic, cycloaliphatic or aromaticaliphatic diol having at least 5 atoms in the chain other than the hydroxyl group are reacted together in the presence of an alkali, such as, for example, sodium hydroxide, potassium hydroxide or the like. By suitable conducting the reaction, it is surprisingly possible to avoid the formation of halogenated phenols or other side products having the chain-disrupting action observed in the known reaction of polyhalobenzenes with monohydric alcohols, to such an extent that polyethers containing halogen atoms and terminal hydroxyl groups are obtained in a good yield.

Any suitable polyhaloaromatic compound may be used but those especially advantageous and preferred for the new etherification process are all chlorinated benzenes, such as, for example, tri-, tetra-, penta- and hexachlorobenzene and the chlorinated diphenyls. Chlorinated naphthalenes and any fluorinated or brominated aromatic hydrocarbons may also be used, such as tri-, tetra-, penta- and hexafluoro and bromobenzene, diphenyls with 3 to 10 aromatically bounded fluorine, chlorine or bromine atoms, tri- to octa-fluoro-, chloro- and bromo-naphthalenes.

Any suitable diol may be used, such as, for example, 1,5-pentane diol, 1,6-hexanediol, diethylene glycol, triethylene glycol, 2,2-dimethylpropanediol, 2-ethylpropanediol, 2,2-(4,4'-dihydroxy dicyclohexyl)-propane, quinitol and the like. Moreover, mixed aromatic-aliphatic glycols, such as p-xylylene glycol, the dihydroxy alkyl ethers of hydroquinone, such as, for example, dihydroxyethyl- or dihydroxypropyl-ethers of hydroquinone may be used. Other suitable diols include the dihydroxyalkyl ethers of tetrachlorohydroquinone, resorcinol, pyrocatechol, 4,4'-dihydroxydiphenyl, 2,2'-dihydroxydiphenyl 1,4- dihydroxynaphthalene, 1,6 - dihydroxynaphthalene, 2,6-dihydroxynaphthalene, 1,2-dihydroxynaphthalene and of the (4,4'-dihydroxydiphenyl)-alkanes, such as, for example, of 4,4'-(dihydroxy-diphenyl)-methane, 1,1-(4,4'-dihydroxydiphenyl)-ethane, 1,2-(4,4'-dihydroxydiphenyl)-ethane, 2,2-(4,4'-dihydroxydiphenyl)-propane, -butane, -pentane, -phenylethane and 1,1-(4,4'-dihydroxydiphenyl)-cyclohexane and the like. The derivatives of these aromatic dihydroxy compounds can likewise contain one or more alkyl or alkenyl groups, such as methyl, ethyl, allyl or methallyl groups in the nucleus. By using halogenated diols, the halogen content of the polyethers can be further increased.

Moreover, diols can be applied in the present process which have been produced by partial etherification of tri- or polyhydric alcohols, for example, monoallyl, methallyl, tertiary butyl or benzyl ethers of trimethylol propane, glycerol or hexanetriol and also the corresponding dialkyl or dialkenyl ethers of pentaerythritol.

On the other hand, aliphatic diols with less than 5 atoms in the chain other than the hydroxyl group, such as ethylene glycol, propanediol and butanediol do not lead to polyethers according to the methods described herein.

The production of the halogen-containing polyethers can be carried out by any suitable method, such as, for example, by heating an aromatic polyhalogen compound of the aforementioned kind, for example, hexachlorobenzene and a diol of the aforementioned kind in an organic solvent which will not enter into the reaction. Any suitable solvent for the reactants may be used, such as, for example, benzene, toluene, xylene, cymene or lacquer benzine provided that the solvent is substantially immiscible with water. Any water present may be distilled azeotropically from the reaction mixture. Suitable temperatures lie in the range above about 110° C. preferably between about 120° C. and 170° C. Preferably, the calculated quantity of alkali, for example, sodium hydroxide or potassium hydroxide is dropped into the reaction mixture slowly with strong stirring as the etherification proceeds with simultaneous distillation of the water formed by the reaction. After all the alkali has been added, the mixture is further heated by any suitable means until no more water distils off azeotropically.

During the reaction any marked foaming which may take place can be prevented by the addition of any suitable anti-foaming agent, such as, for example, about 5 percent isopropyl naphthalene sulfonic acid sodium salt.

The new halogen-containing polyethers are waxy, partly crystalline, masses or viscous to hard, water-clear or yellow resins. The colors of the resins are influenced to an important extent by the purity of the starting materials used.

The resins can be considerably clarified, if desired, by the addition of reducing agents, such as Rongalit, sodium dithionite or sodium bisulfite.

The new halogen containing aromatic-aliphatic polyethers, especially those having hydroxyl groups, can be used, for example, as intermediate products for the production of synthetic materials which are substantially flame-resistant and are chemically resistant. For example, the polyethers provided by this invention can be reacted with an organic polyisocyanate and cross-linking agent to prepare a polyurethane plastic which may be used for making vehicle tires, machine parts, sponges, upholstery or insulation. The polyurethane may be a cellular product or an elastomeric product which is substantially nonporous. Suitable processes for reacting the polyether of this invention to form a polyurethane are disclosed in U.S. Patents 2,764,565, 2,729,618, 2,620,516 and 2,621,166.

The NCO groups of an organic polyisocyanate will react with the active hydrogen of the hydroxyl groups of the polyethers provided by this invention to form urethane linkages. Polyurethanes having long chains can be prepared by such a reaction. Any suitable organic polyisocyanate may be used, such as, for example, toluylene-2,4-diisocyanate, toluylene-2,6-diisocyanate, 1,5-naphthylene diisocyanate, p-phenylene diisocyanate, 4,4'-diphenyl dimethyl methane diisocyanate, ethylene diisocyanate, ethylidene diisocyanate, triphenyl methane triisocyanate and the like. Other suitable polyisocyanates are disclosed in the aforesaid patents. The organic polyisocyanates, polyether containing halogens and cross-linking agent may be mixed together simultaneously or the polyether may be reacted with the organic polyisocyanate, preferably under substantially anhydrous conditions, to form an adduct or prepolymer, for instance of the formula:

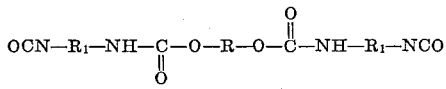

when 1 mol of a polyether mentioned above is reacted with 2 mols of a diisocyanate, or for instance of the formula:

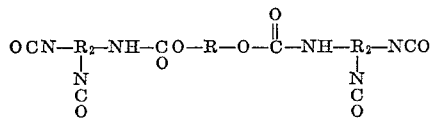

when 1 mol of a polyether mentioned above is reacted with 2 mols of a triisocyanate, wherein $R_1$ is a bivalent organic radical, $R_2$ is a trivalent organic radical and R is the radical of a polyether mentioned above, for instance with the formula:

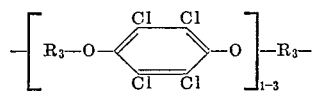

wherein $R_3$ is a bivalent organic radical with at least 5 atoms in the chain. Such a prepolymer is later reacted with a chain-extender or cross-linking agent to form the final cured polyurethane product. Any suitable catalyst, such as, for example, a tertiary amine catalyst, or one of the other catalysts disclosed in the aforesaid patent or the like, may be used to accelerate the reaction. If a cellular product is prepared, water is ordinarily used as the chain-extender or cross-linker. An organic compound having a molecular weight of less than 500 and at least two reactive hydrogen atoms is usually preferred for making a substantially non-porous rubber-like polyurethane although water may be used for this purpose provided the carbon dioxide formed during the reaction is removed by processing on a rubber mill or the like. Suitable cross-linking agents are for instance: ethylene glycol, or other glycols, furthermore glycerol, tri-methylolethane or -propane, hexanetriol, pentaerythritol, ethylene diamine and the like, some of which are disclosed in the aforesaid patents.

Example 1

About 632 parts by weight of di-β-hydroxyethyl ether of 2,2-(4,4'-diphenyl)-propane and about 427 parts by weight of hexachlorobenzene are heated to boiling with strong stirring in about 250 parts by weight of xylene so that the water produced distils over azeotropically. About 172.5 parts by weight of potassium hydroxide in about 110 parts of water are then added in the course of two hours. Finally the mixture is heated for about 3 further hours until no more reaction water distils over azeotropically. The solvent is removed under reduced pressure. The polyether is washed several times with sodium hydroxide and water until the washing water no longer shows cloudiness upon addition of dilute acid. The water is then separated under reduced pressure. The resin is dissolved in equal parts by weight of ethylene chloride, filtered from mechanical impurities and the solvent distilled off under reduced pressure. There are obtained about 940 parts by weight of a clear slightly yellowish resin, brittle in the cold and having a softening point of about 57° C. The hydroxyl number is about 82 to about 85, and the chlorine content is about 23.7 percent.

Example 2

About 236 parts by weight of 1,6-hexanediol and about 512.6 parts by weight of hexachlorobenzene are heated to boiling in about 250 parts by weight of xylene with strong stirring so that the water produced distils off azeotropically with the solvent and can be separated. About 172 parts by weight of potassium hydroxide in about 110 parts of water are dropped in the course of about 3 hours. The solution is heated for a further 2 hours until no more reaction water distils over azeotropically. The solvent is removed under reduced pressure and the resin purified by washing several times with diluted caustic soda and water as in Example 1. About 560 parts by weight of clear slightly yellowish resin, thickly liquid in the cold, are obtained. The resin becomes partly crystalline after standing for a long time. The hydroxyl number is about 68 to about 70 and the chlorine content is about 44.1 percent.

Example 3

About 480 parts by weight of 2,2-(4,4'-dihydroxydicyclohexyl)-propane, about 427 parts by weight of hexachlorobenzene and about 5 parts by weight of isopropyl naphthalene sulfonic acid sodium salt (to prevent strong foaming) are heated to the boil with stirring in about 250 parts by weight of xylene, so that the water produced distils off azeotropically with the solvent. About 173 parts by weight of potassium hydroxide in about 110 parts of water are dropped in in the course of about 1½ hours. The heating is continued for a further 3¼ hours until not more reaction water distils over azeotropically. The solution is treated with water and washed with caustic soda and finally with water until the washing water shows no cloudiness after acidifying. The xylene solution is filtered and the solvent distilled off under reduced pressure. There is obtained in almost quantitative yield a colorless water-clear brittle resin of a softening point of about 112° C. The hydroxyl number is about 137 to about 139 and the chlorine content is about 27.1 percent to about 27.2 percent.

Example 4

About 250 parts by weight of 2,2-dimethylpropane diol, about 570 parts by weight of hexachlorobenzene and about 5 parts by weight of isopropyl naphthalene sulfonic acid sodium salt are heated to the boil in about 250 parts by weight of xylene and treated in the course of about 2½ hours with about 230 parts by weight of potassium hydroxide in about 145 parts of water with strong stirring. Finally the mixture is heated for a further two hours until no more reaction water goes over. The solvent is distilled off in vacuum and the polyether worked up as in Example 1. The polyether is a yellow clear resin which is a viscous fluid when cold. The hydroxyl number is about 66 to about 67 and the chlorine content is about 47.4 percent.

Example 5

About 696.6 parts by weight of di-β-hydroxyethyl ether of 2,2,-(3,3'-diallyl-4,4'-dihydroxydiphenyl)-propane and about 427 parts by weight of hexachlorobenzene are heated to the boil with stirring and about 300 parts by weight of xylene so that the water produced distils off azeotropically with the solvent. About 172.5 parts by weight of potassium hydroxide in about 110 parts of water are dropped in in the course of about 5 hours with strong stirring. The mixture is heated for a further 2 hours until no more reaction water goes over azeotropically. The solvent is distilled off under reduced pressure and the polyether worked up as in Example 1. There is obtained in almost quantitative yield a slightly yellow clear resin which is plastic at room temperature. The hydroxyl number is about 62 to about 67 and the chlorine content is about 24.6 percent to about 24.9 percent.

*Example 6*

About 104.4 parts by weight of the monoallyl ether of trimethylol propane and about 142.4 parts by weight of hexachlorobenzene are heated to the boil in about 150 parts by weight of xylene. The mixture is treated with about 57.5 parts by weight of potassium hydroxide in about 60 parts of water with strong stirring in the course of about 2 hours. After a further 2½ hours heating, the reaction is ended. The solvent is distilled off under reduced pressure and the polyether filtered in the warm after washing several times with diluted caustic soda and water. A yellow resin is obtained which is highly viscous at room temperature. The hydroxyl number is about 83 to about 84 and the chlorine content is about 36.4 percent.

*Example 7*

About 255 parts by weight of diethylene glycol, about 570 parts by weight of hexachlorobenzene and about 5 parts by weight of the sodium salt of isopropyl naphthalene sulfonic acid are heated to the boil with strong stirring in about 250 parts by weight of xylene. The mixture is treated with about 230 parts by weight of potassium hydroxide in about 145 parts of water in the course of about 2 hours and is heated for a further 2 hours until no more reaction water goes over azeotropically. The solvent is distilled off under reduced pressure and the polyether is washed several times with diluted caustic soda and water and filtered while warm. There remain about 500 parts by weight of a yellow clear resin which, after standing in the cold for a long time becomes partly crystalline. The hydroxyl number is about 74 to about 77 and the chlorine content is about 46.4 percent to about 46.6 percent.

*Example 8*

A mixture of a polyether prepared in accordance with Example 1 above and having a molecular weight of about 1350 is mixed with toluylene-2,4-diisocyanate in an apparatus of the type disclosed in U.S. Patent 2,764,565. Substantially simultaneously, about 3 parts of the adipic acid ester of N-diethylamino ethanol, about 2 parts ammonium oleate and about 1.2 parts water are injected into the stream of the polyether diisocyanate per 125 parts mixture. The mixture contains the polyether and diisocyanate in the ratio of about 100 parts polyether per 25 parts by volume diisocyanate. The temperature of the mixture before chemical reaction is about room temperature. The resulting mixture is discharged substantially instantaneously from the apparatus into a suitable mold or other shaping device where chemical reaction is permitted to proceed with the formation of a foam which solidifies to form a cellular polyurethane plastic.

An organic cross-linking agent or chain-extender, such as an organic diamine or a glycol, may be substituted for the water in the foregoing example to prepare an elastomeric substantially non-porous polyurethane. Ethylene glycol, butylene glycol, ethylene diamine or the like may be used for this purpose.

Any of the other diols or chlorinated aromatic compounds of the classes disclosed herein as suitable may be substituted in the foregoing examples for those described. Other alkalis, such as, for example, lithium, sodium, and potassium metal, lithium oxide, sodium oxide, and potassium oxide, and lithium hydroxide and sodium hydroxide, and the like, may be substituted in the foregoing examples for the potassium hydroxide. Any suitable amount of alkali may be used but preferably about 2 to 3 mols alkali per mol chlorinated aromatic compound should be used. The novel polyethers containing halogen atoms and terminal hydroxyl groups should preferably have a molecular weight of at least about 500 especially if they are to be used in the preparation of polyurethane plastics. For this purpose it is advantageous to use some excess of polyisocyanate, for example up to about 50 percent, over that required to react with all the hydroxyl groups of the polyether to prepare the polyurethane.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the production of a polyurethane which comprises reacting a polyether containing halogen atoms and hydroxyl groups with an organic polyisocyanate, said polyether obtained by a process which comprises heating a mixture of a polyhalogen aromatic compound having at least three halogen atoms as its sole reactive groups, directly attached to an aromatic ring, a diol having at least 5 atoms in the chain other than the hydroxyl groups, an alkali, and an organic solvent inert to the reactants and substantially immiscible with water and removing the water from the reaction mixture by azeotropic distillation with said inert solvent until water no longer distills off azeotropically.

2. The process according to claim 1 wherein the alkali is added to the reaction mixture as the etherification proceeds.

3. The process according to claim 1 wherein the temperature of the reaction is at least about 110° C.

4. Process according to claim 1 wherein the polyhalogen aromatic compound is a polychlorobenzene.

5. Process according to claim 1 wherein the temperature of reaction is from about 120° C. to about 170° C.

6. The process of claim 1 wherein said diol is an aliphatic diol.

7. The process of claim 1 wherein the diol is a cycloaliphatic diol.

8. The process of claim 1 wherein the diol is an aromatic-aliphatic diol.

9. A process for the production of a polyurethane which comprises reacting a halogen-containing polyether with an organic polyisocyanate, said polyether obtained by a process which comprises boiling a mixture of at least 1 mol of a polyhalogen aromatic compound having at least 3 halogen atoms as its sole reactive groups, directly attached to an aromatic ring, at least 1 mol of a diol having at least 5 atoms in the chain other than the hydroxyl groups, about 1.6 to about 2.0 mols of alkali and an organic solvent inert to the reactants and substantially immiscible with water, and removing the water from the boiling reaction mixture by azeotropic distillation with said inert organic solvent until water no longer distills off azeotropically.

10. The polyurethane prepared by the process of claim 1.

11. A process for the production of a polyurethane which comprises reacting an organic polyisocyanate with a polyhalogen containing polyether obtained from the reaction of a polyhalogen aromatic compound having halogen groups as the sole reactive groups connected to an aromatic ring and a diol having at least 5 atoms, an alkali and an inert organic solvent substantially immiscible with water and removing the water from the reaction mixture by azeotropic distillation with said inert solvent.

12. A process for the production of a polyurethane which comprises reacting in the presence of a cross-linking agent an organic polyisocyanate with a polyhalogen containing polyether obtained from the reaction of a polyhalogen aromatic compound having halogen groups as the sole reactive groups connected to an aromatic ring and a diol having at least 5 atoms, an alkali and an inert organic solvent substantially immiscible with water and removing the water from the reaction mixture by azeotropic distillation with said inert solvent.

13. The polyurethanes obtained by the process of claim 12.

References Cited by the Examiner
UNITED STATES PATENTS

| | | | |
|---|---|---|---|
| 2,698,315 | 12/1954 | Greenlee | 260—77.5 |
| 2,712,000 | 6/1955 | Zech | 260—47 |
| 2,911,390 | 11/1959 | Smith | 260—77.5 |
| 2,948,691 | 8/1960 | Windemuth et al. | 260—77.5 |

WILLIAM H. SHORT, *Primary Examiner.*
LOUISE P. QUAST, *Examiner.*